United States Patent
Banerjee et al.

(10) Patent No.: US 9,513,696 B2
(45) Date of Patent: Dec. 6, 2016

(54) MIGRATING APPLICATIONS ACROSS A GROUP OF PERSONAL MOBILE DEVICES BASED ON BATTERY USAGE

(75) Inventors: Sujata Banerjee, Palo Alto, CA (US); Parameswaran Ramanathan, Madison, WI (US); Kyu Han Kim, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 155 days.

(21) Appl. No.: 14/383,180

(22) PCT Filed: Mar. 8, 2012

(86) PCT No.: PCT/US2012/028381
§ 371 (c)(1),
(2), (4) Date: Sep. 5, 2014

(87) PCT Pub. No.: WO2013/133845
PCT Pub. Date: Sep. 12, 2013

(65) Prior Publication Data
US 2015/0019889 A1 Jan. 15, 2015

(51) Int. Cl.
G06F 1/00 (2006.01)
G06F 1/32 (2006.01)
G06F 3/0484 (2013.01)
G06F 1/26 (2006.01)

(52) U.S. Cl.
CPC .............. G06F 1/329 (2013.01); G06F 1/26 (2013.01); G06F 1/3206 (2013.01); G06F 1/3212 (2013.01); G06F 3/04847 (2013.01); Y02B 60/1292 (2013.01); Y02B 60/144 (2013.01)

(58) Field of Classification Search
CPC ...... G06F 1/3203; G06F 1/329; G06F 1/3246; G06F 1/26; G06F 1/3206; G06F 1/3212; G06F 3/04847
USPC .... 370/311; 320/107; 702/63; 455/574, 572, 455/343.5; 713/324, 320, 300; 718/103
See application file for complete search history.

(56) References Cited

U.S. PATENT DOCUMENTS 6,697,953 B1 * 2/2004 Collins ................. G06F 1/3203
713/320
7,583,951 B2 9/2009 Gibbs
7,584,376 B2 9/2009 Finkelstein et al.
(Continued)

FOREIGN PATENT DOCUMENTS

CN 101727166 6/2010
EP 2015162 A1 1/2009
(Continued)

OTHER PUBLICATIONS

Anatasi et al. "Power Management in Mobile and Pervasive Computing System" Uni of Pisa, Dept. of Information Engineering.

*Primary Examiner* — Aurel Prifti
(74) *Attorney, Agent, or Firm* — Trop, Pruner & Hu

(57) ABSTRACT

A system, method, and non-transitory computer readable medium for virtualizing battery in a personal mobile device or across a group of personal mobile devices controlled by a user are provided. The user specifies a set of power management policies for applications running in the personal mobile device(s). Battery usage per application is monitored and resources for the applications are scheduled based on the monitored battery usage and the power management policies.

11 Claims, 12 Drawing Sheets

(56) References Cited

U.S. PATENT DOCUMENTS

| | | | |
|---|---|---|---|
| 7,598,702 B2 * | 10/2009 | Walrath | G06F 1/26 320/107 |
| 7,864,720 B2 | 1/2011 | Jeyaseelan | |
| 7,873,852 B2 * | 1/2011 | Bell | H02J 7/0024 455/572 |
| 8,958,854 B1 * | 2/2015 | Morley | H04B 1/38 370/311 |
| 2005/0060590 A1 * | 3/2005 | Bradley | G06F 9/5077 713/320 |
| 2005/0085277 A1 | 4/2005 | Chen | |
| 2006/0140140 A1 * | 6/2006 | Fuccello | G06F 1/3203 370/311 |
| 2007/0079154 A1 * | 4/2007 | Diefenbaugh | G06F 1/3203 713/300 |
| 2007/0243852 A1 * | 10/2007 | Gibbs | H04W 52/0264 455/343.5 |
| 2008/0186086 A1 | 8/2008 | Bell | |
| 2008/0200220 A1 * | 8/2008 | Jackson | G06F 1/3203 455/574 |
| 2008/0313483 A1 | 12/2008 | Pasupuleti | |
| 2009/0187782 A1 * | 7/2009 | Greene | G06Q 10/00 713/340 |
| 2009/0225230 A1 | 9/2009 | Arroyo et al. | |
| 2010/0023940 A1 * | 1/2010 | Iwamatsu | G06F 1/3203 718/1 |
| 2010/0145643 A1 * | 6/2010 | Katpelly | G06F 1/3203 702/63 |
| 2010/0146312 A1 | 6/2010 | Liao | |
| 2011/0159931 A1 * | 6/2011 | Boss | H04W 52/0264 455/574 |
| 2011/0213997 A1 * | 9/2011 | Kansal | G06F 1/3203 713/324 |
| 2011/0268000 A1 | 11/2011 | Kashikar et al. | |
| 2012/0047379 A1 * | 2/2012 | Chen | G06F 1/3212 713/320 |
| 2014/0024416 A1 * | 1/2014 | Xie | H04W 52/0261 455/574 |
| 2014/0195843 A1 * | 7/2014 | Lai | H04W 52/0209 713/324 |
| 2014/0365795 A1 * | 12/2014 | Nielsen | G06F 9/45558 713/320 |
| 2015/0058617 A1 * | 2/2015 | Oishi | G06F 9/5094 713/100 |
| 2015/0177811 A1 * | 6/2015 | Bose | G06F 1/3287 713/324 |
| 2015/0347179 A1 * | 12/2015 | Barraclough | G06F 9/4818 718/103 |

FOREIGN PATENT DOCUMENTS

| | | | |
|---|---|---|---|
| KR | 10-2009-0064403 A | 6/1999 | |
| KR | 10-2010-0126025 A | 12/2010 | |
| WO | WO 2010147610 A1 * | 12/2010 | G02B 13/0065 |

* cited by examiner

This application is a national stage application under 35 U.S.C. §371 of PCT/US2012/028381, filed Mar. 8, 2012.

MIGRATING APPLICATIONS ACROSS A GROUP OF PERSONAL MOBILE DEVICES BASED ON BATTERY USAGE

CROSS-REFERENCE TO RELATED APPLICATION

This application is a national stage application under 35 U.S.C. §371 of PCT/US2012/028381, filed Mar. 8, 2012.

BACKGROUND

Personal mobile devices have become increasingly popular. Users typically carry multiple personal mobile devices at any given time to satisfy their mobile computing and communication needs. These devices may include, for example, phones and smart phones, laptops, tablets, gaming devices, digital cameras, personal digital assistants, and so on. Personal mobile devices run multiple applications at any given time and run on batteries while their users are mobile. There are various types of batteries available (e.g., lithium polymer batteries, lithium ion batteries, nickel cadmium batteries, etc.) but they all suffer from limited lifetimes. Even though battery technology has improved significantly in the last few years, it is still quite common for users to run down their devices' batteries unexpectedly because of the unpredictable mix of applications they run at any given time.

The battery usage or consumption of a personal mobile device may be monitored with a power management tool. Most power management tools simply monitor a device's battery usage, set off alarms when the battery usage drops below a certain threshold, and display the battery usage for the users to act upon, e.g., by changing the device when needed. Recent took have been developed to monitor the percentage of battery used by a given component or application running in a devices. These took, however, suffer from significant monitoring overhead and are limited to working in only a small category of devices.

The personal mobile devices of today therefore have a very coarse level of granularity at which battery usage is monitored. Power management tools may monitor battery usage per application but they do not allow users to allocate the battery usage per application. For example, if a user is expecting an important business call at a smart phone that has low battery, the user cannot automatically allocate the battery to the phone call and suspend other applications from draining the battery. Users have to resort to ad-hoc methods based on experience and rudimentary monitoring to turn off applications that are perceived to consume more battery. Further, there is no way for a user to manage or coordinate total available battery power across multiple personal mobile devices.

In addition, a single mobile device is used in multiple contexts (e.g., work, personal, guest, etc.) by a user. These contexts can be considered as multiple user personas that may impose different requirements on the device usage policies, including those related to the battery. A particular persona, say the work persona, may put a higher priority to the e-mail and phone usage, while the guest persona may put a higher priority on some game applications.

BRIEF DESCRIPTION OF THE DRAWINGS

The present application ma be more fully appreciated in connection with the following detailed description taken in conjunction with the accompanying drawings, in which like reference characters refer to like parts throughout, and in which.

DETAILED DESCRIPTION

A system, method, and non-transitory computer readable medium for virtualizing battery in a personal mobile device or across personal mobile devices are disclosed. As generally described herein, a personal mobile device is a portable computing and communication device that is used to process, receive, and send information in various environments. Personal mobile devices may include, but not be limited to, for example, phones and smart phones, laptops, tablets, gaming devices, digital cameras, and personal digital assistants, among others.

In various embodiments, it battery virtualization module virtualizes the battery in a personal mobile device. In other embodiments, a coordinated battery virtualization module virtualizes the total available battery across a group of diverse personal mobile devices controlled by a user. Battery virtualization, as generally used herein, refers to the ability to allocate an available battery charge among specific applications and multiple user personas and to ensure that designated applications have higher priority and access to the battery. In the first set of embodiments, the applications run on the personal mobile device itself. In the second set of embodiments, the applications may run across the group of diverse personal mobile devices controlled by the user. The goal in both cases is to maximize the total battery life, making sure that battery can be reserved for specific high priority applications, and thus enhance the user's Quality of Experience ("QoE").

It is appreciated that embodiments described herein below may include various components and features. Some of the components and features may be removed and/or modified without departing from a scope of the system, method, and non-transitory computer readable medium for virtualizing battery across personal mobile devices. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also the embodiments may be used in combination with each other.

Reference in the specification to "an embodiment," an "example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment. As used herein, a component is a combination of hardware and software executing on that hardware to provide a given functionality.

Figure 1:
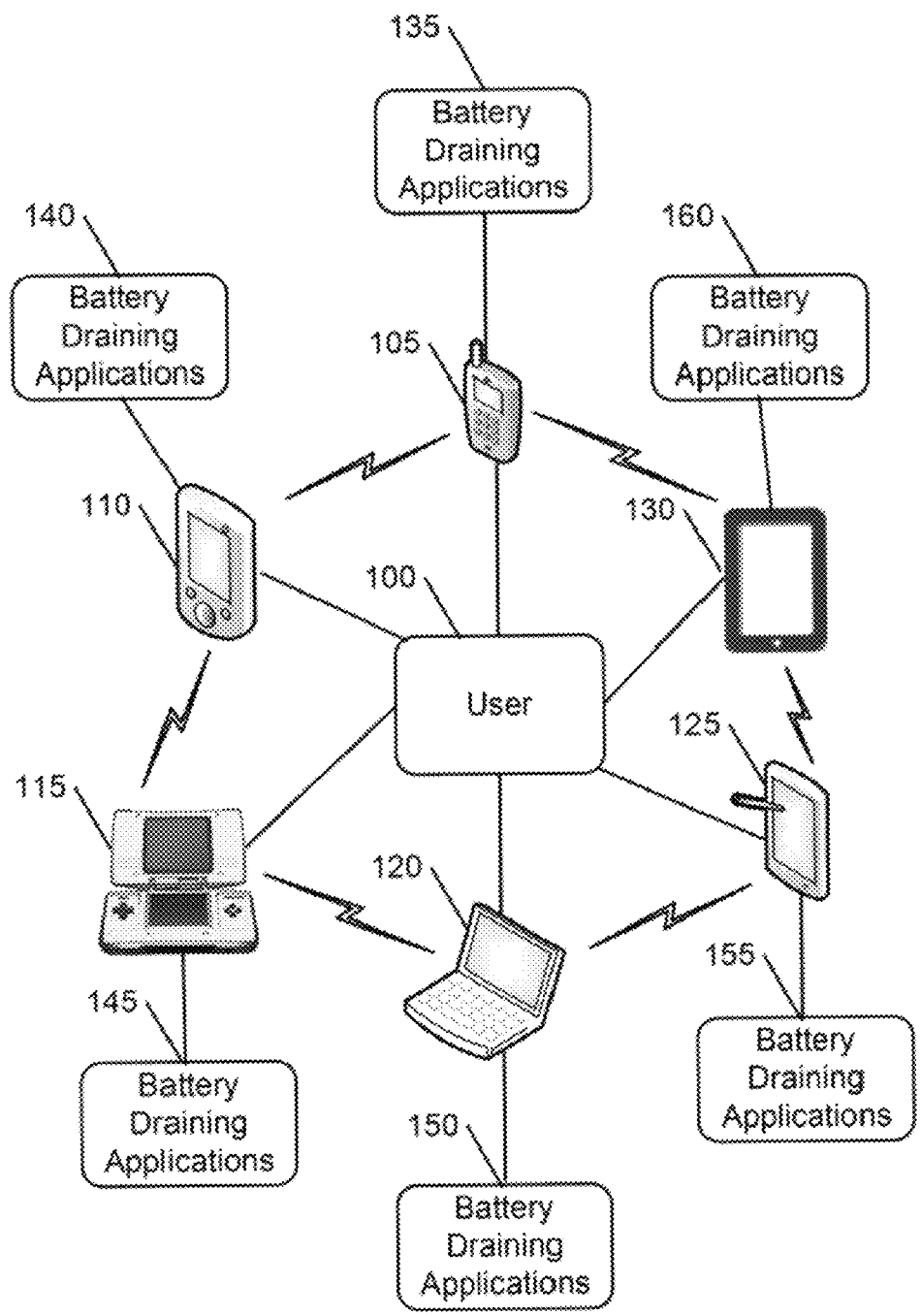
FIG. 1 is a schematic diagram illustrating an example environment in which the various embodiments may be implemented.

Referring now to FIG. 1, a schematic diagram illustrating an example environment in which the various embodiments may be implemented is described. User 100 may use a number of personal mobile devices for his/her mobile computing and/or communication needs, including, for example, a phone 105, a smart phone 110, a video gaming device 115, a laptop 120, a personal digital assistant 125, and a tablet 130, all connected by a wired and/or wireless communications network (represented by the arrows between each device). At any given time, the personal mobile devices 105-130 may be running multiple applications 135-160 that consume and drain battery power on each device. The personal mobile devices 105-130 may have power management tools that enable the user 100 to monitor the battery usage in each device to determine which of the applications 135-160 consumes the most battery on any given device. With the battery virtualization module described in more detail herein below, the user 100 may be able to allocate any given device's available battery among applications running in the device. And with the coordinated battery virtualization module described in more detail herein below, the user 100 may be able to allocate the total battery power across the group of personal mobile devices 105-130 such that the user 100 is guaranteed to have the necessary power to run all of his/her applications as desired.

Figure 2:
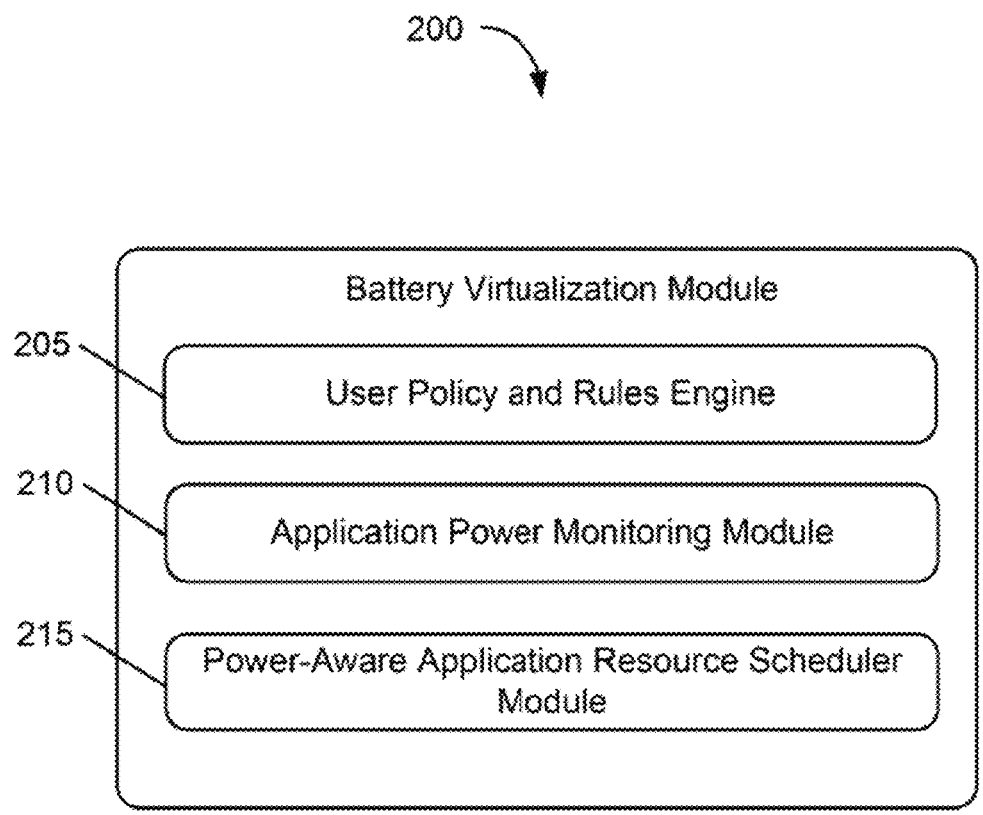
FIG. 2 is a schematic diagram illustrating an example battery virtualization module according to various embodiments.

Attention is now directed to FIG. 2, which illustrates an example battery virtualization module in a single device according to various embodiments. The Battery Virtualization module 200 runs on a personal mobile device to allocate battery among applications running in the device. Battery Virtualization module 200 has three main components: (1) a User Policy and Rules engine 205; (2) an Application Power Monitoring module 210; and (3) a Power-Aware Application Resource Scheduler module 215. The User Policy and Rules engine 205 provides the user a language and a user interface to specify policies and rules for managing power and classifying applications running in the device according to the user's requirements and preferences.

For example, the user could specify policies for prioritizing phone functionality at the highest level, while putting all business applications at the next priority level, and so on. In another example, the user may allocate percentages of battery usage across applications, such as, for example, allocate 20% of battery usage to games, allocate 50% of battery usage to phone calls, and so on. As appreciated by one skilled in the art, users today run applications with multiple personas (e.g., work, personal, parent, etc.) as well as varying contexts (e.g., locations, cost, etc.). The policies that the user may specify with the User Policy and Rules engine 205 may be based on the user's multiple personas and context information.

The Application Power Monitoring module 210 monitors battery usage per application. CPU and memory usage on a per application basis are also monitored, which help in estimating the battery usage. The Application Power Monitoring module 210 may adopt various models to monitor battery usage, including models that are device-specific. Lastly, the Power-Aware Application Resource Scheduler module 215 uses the monitoring information acquired by the Application Power Monitoring module 210 to make resource scheduling decisions for applications running in the device. For example, applications that have used up their battery allocation may be forced to close and thus starved for resources such as CPU cycles, I/O devices, memory accesses, and so on.

Figure 3:
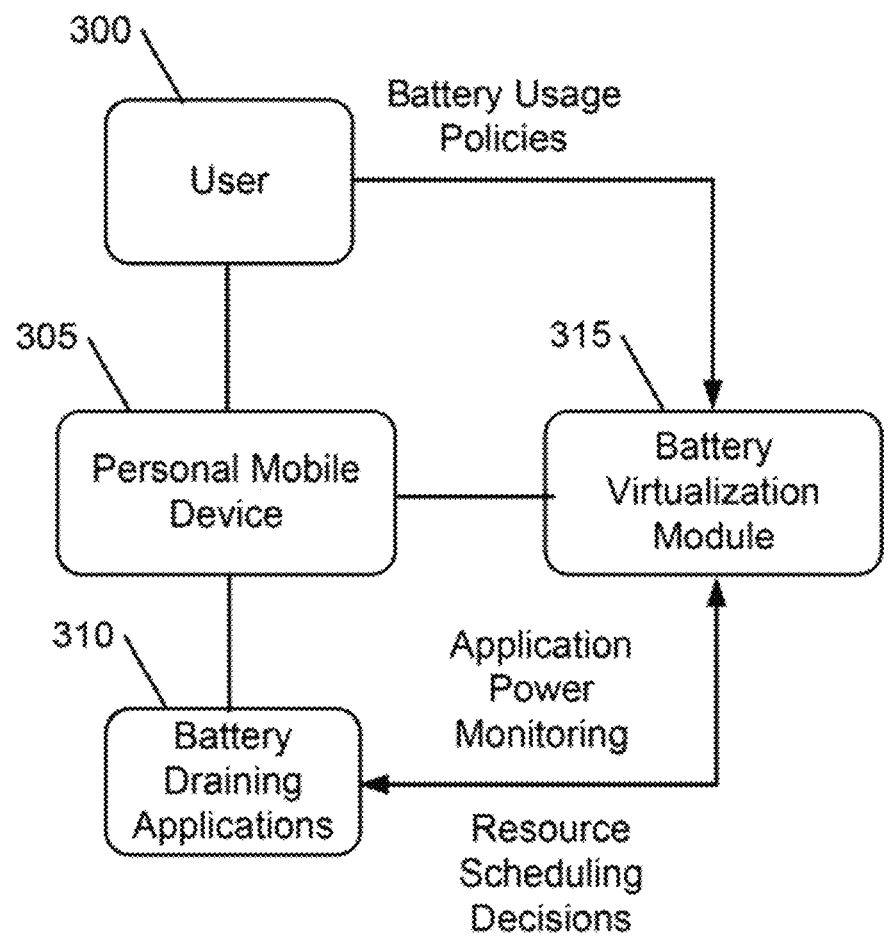
FIG. 3 illustrates an example of a battery virtualization module of FIG. 2 in use in a personal mobile device.

An example of a battery virtualization module of FIG. 2 in use in to personal mobile device is illustrated in FIG. 3. User 300 has a personal mobile device 305 which runs a number of battery draining applications 310. A battery virtualization module 315 running on the personal mobile device 305 enables the user 300 to specify battery usage policies for allocating the battery in the personal mobile device 305 among the battery draining applications 310. In doing so, the battery virtualization module 315 monitors the battery usage of the applications 310 running in the device 305 and makes resource scheduling decisions accordingly.

In various embodiments, when the personal mobile device 315 is being charged, the battery virtualization module 315 allocates the battery for each application, class of applications, or user personas, based on battery charging policies. For example, the user might want proportional charging or priority-based charging for each application, class of applications or user personas.

Figure 4:
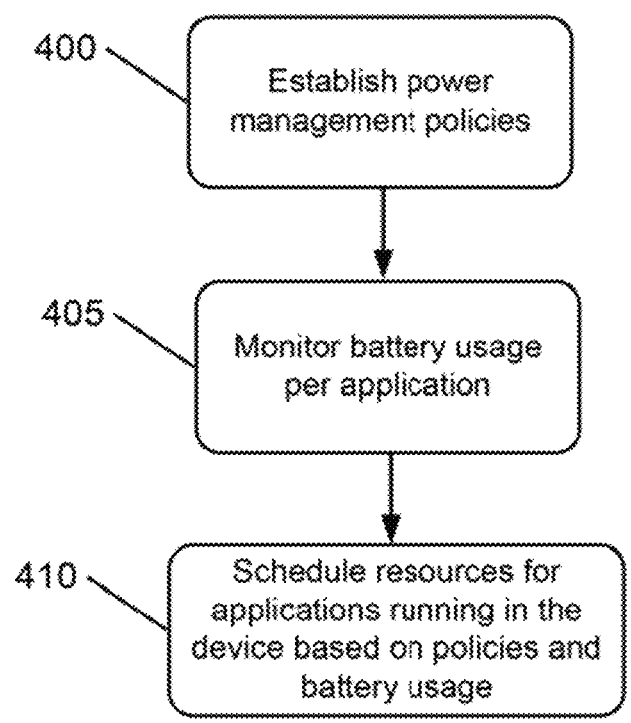
FIG. 4 is a flowchart for virtue being a battery in a personal mobile device.

A flowchart for virtualizing a battery in a personal mobile device is shown in FIG. 4. First, power management policies for managing power and classifying applications manning in the device are established according to as user's requirements and preferences (400). Next, battery usage per application is monitored on the device (405). The monitored battery usage and policies are then used to schedule resources for the applications running in the device (410).

Figure 5:
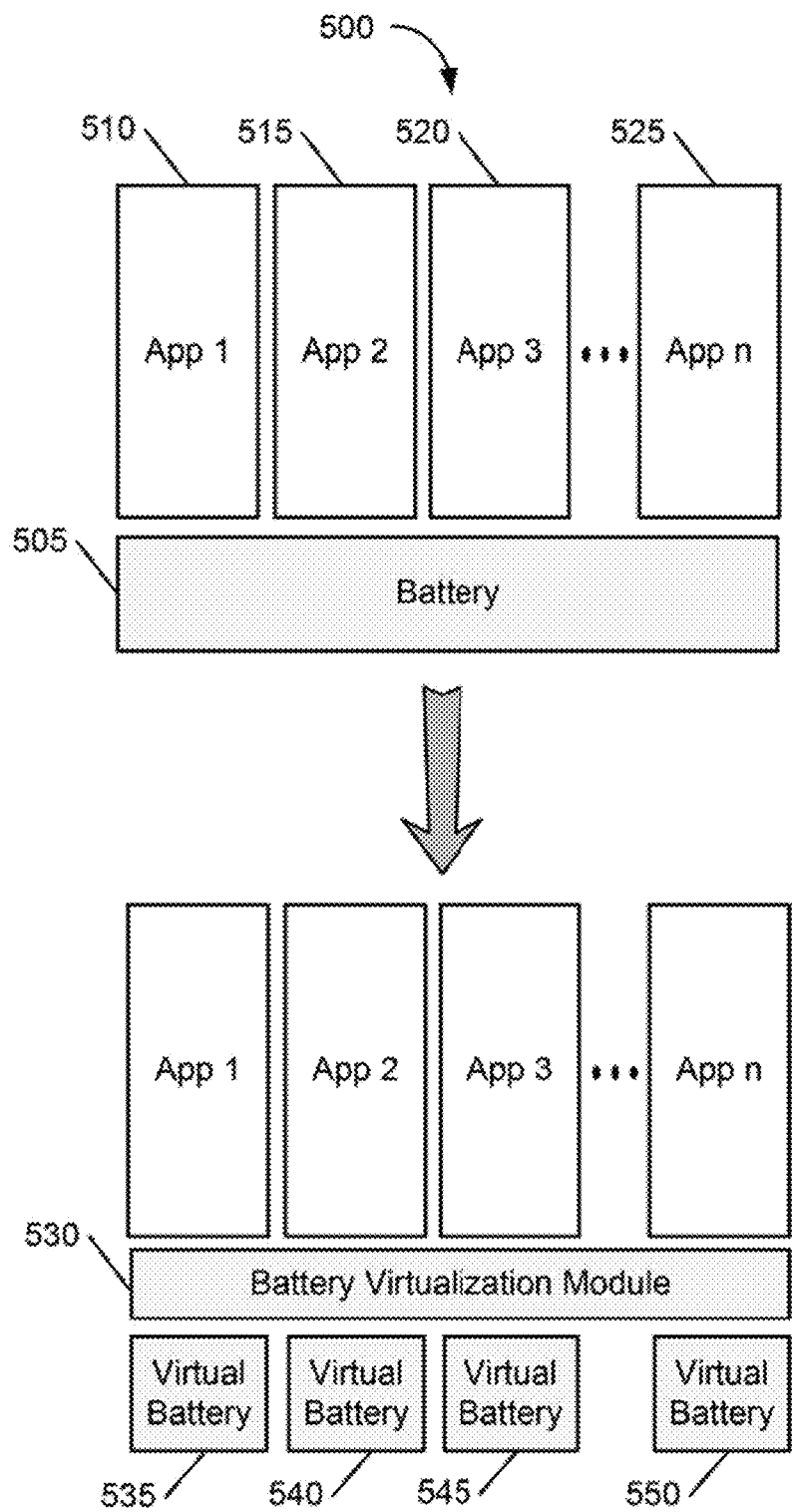
FIG. 5 is a schematic diagram illustrating battery virtualization in a personal mobile device.

It is appreciated that each application running in the device has the perception that it has its own dedicated battery, even though there is a single battery that is shared by all applications. FIG. 5 shows a schematic diagram illustrating battery virtualization in a personal mobile device. Personal mobile device 500 has a single physical battery 505 that is shared among various applications, such as applications 510-525. When running battery virtualization module 530, the mobile device 500 has its physical battery virtualized into multiple dedicated virtual batteries 535-550, one for each type of application or application classes. The dedicated virtual battery for each application is the portion of the physical battery 505 allocated for the application by the power management policies established by the user. For example, the user may specify that 20% of the battery is to be allocated for games, 20% of the battery is to be allocated for email, 40% of the battery is to be allocated for web browsing, and the other 20% is to be allocated for phone applications. The gaming applications, email application, and phone applications in this device each perceive to have a dedicated battery that is 20% of the total battery in the device. Similarly, the web browsing application perceives to have as dedicated battery that is 40% of the total battery in the device.

Figure 6:
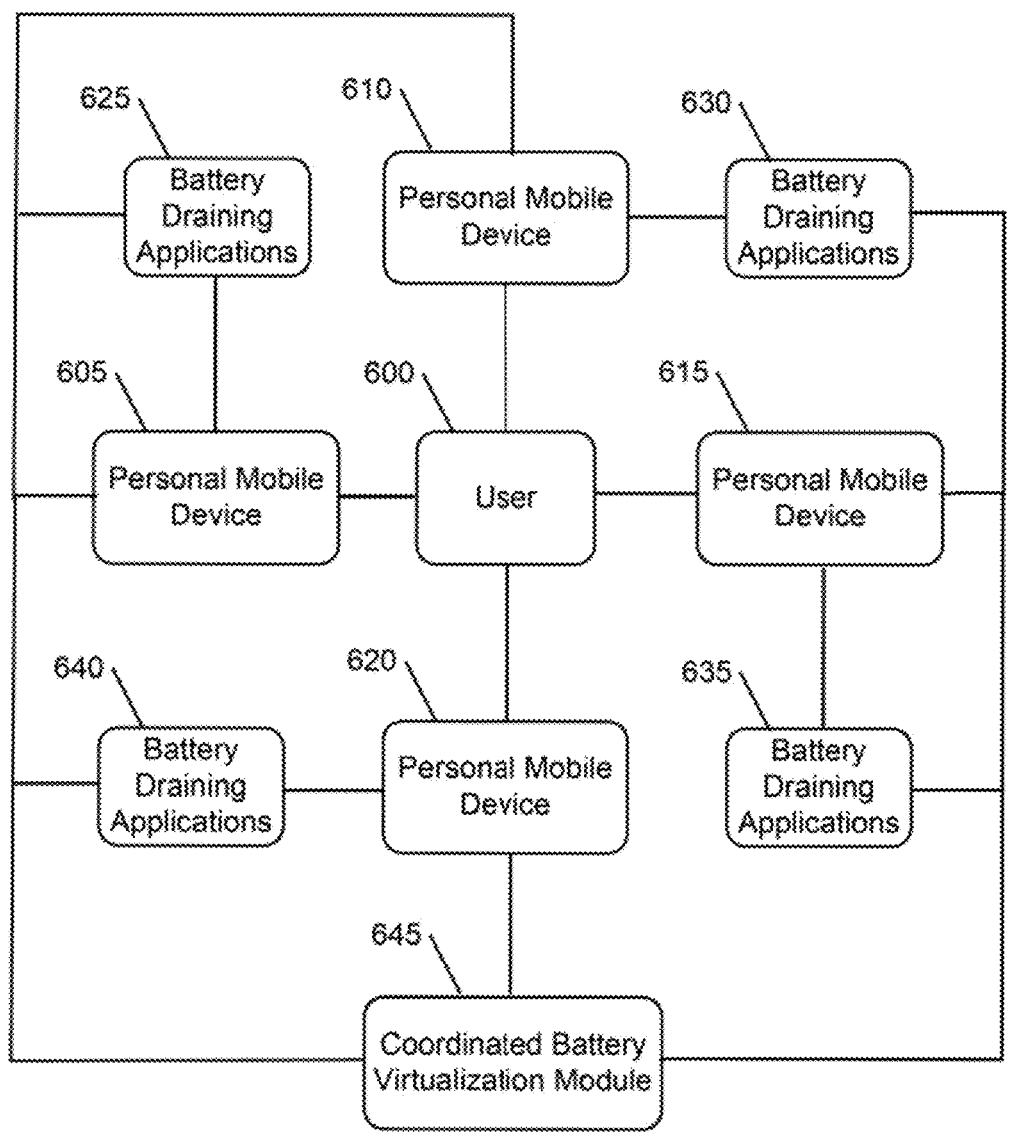
FIG. 6 is a schematic diagram illustrating a coordinated battery virtualization module running across a group of devices controlled by a user.

In various embodiments, the battery virtualization module described above with reference to FIGS. 2-5 can be extended to virtualize battery across a group of diverse personal mobile devices controlled by a user. A coordinated battery virtualization module run across the devices controlled by the user or it can be deployed in a cloud network. FIG. 6 illustrates a coordinated battery virtualization module running across a group of devices controlled by a user. User 600 may control a number of personal mobile devices, such as, for example, personal mobile devices 605-620. Each of the personal mobile devices 605-620 runs a number of battery draining applications 625-640. A coordinated battery virtualization module 645 runs across the personal mobile devices 605-620 to allocate the total battery power among all battery draining applications 625-640.

Figure 7:
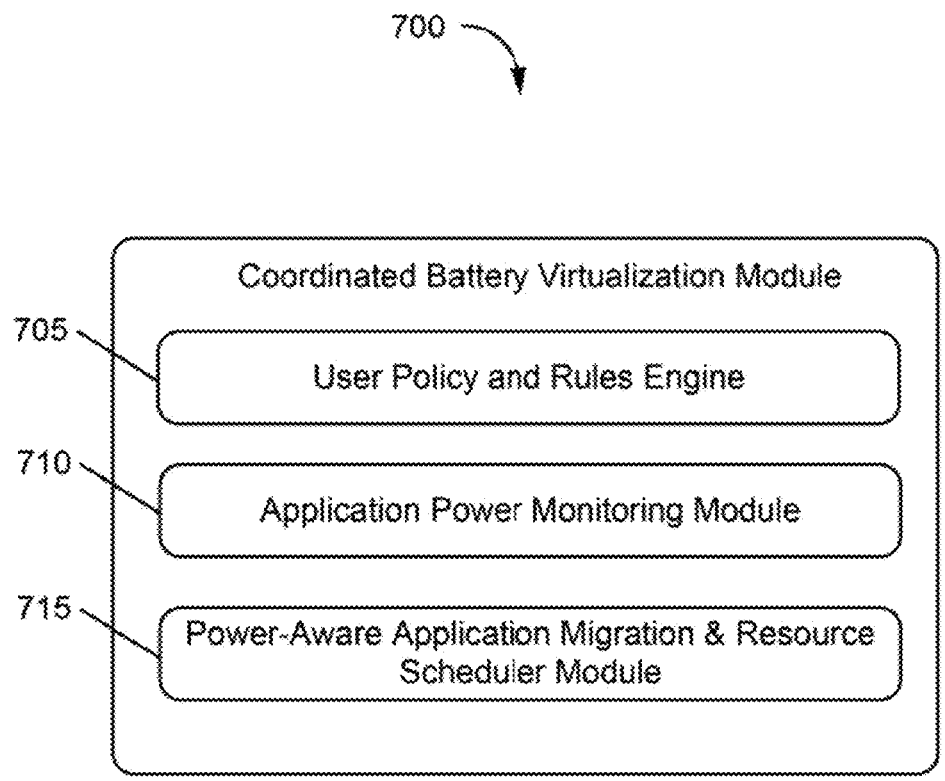
FIG. 7 is a schematic diagram of an example coordinated battery virtualization module in more detail.

FIG. 7 shows an example coordinated battery virtualization module in more detail. The Coordinated Battery Virtualization module 700, similar to the battery virtualization module 200 shown in FIG. 2, also has three main components: (1) a User Policy and Rules engine 705; (2) an Application Power Monitoring module 710; and (3) Power-Aware Application Migration and Resource Scheduler module 715. The User Policy and Rules engine 705 provides the user a language and a user interface to specify policies and rules for managing power and classifying applications running across the user's personal mobile devices according to the user's requirements and preferences and based on the user's multiple personas and context information for each device.

The Application Power Monitoring module 710 monitors battery usage per application. CPU and memory usage are also monitored and used to estimate the battery usage. The Application Power Monitoring module 710 may adopt various models to monitor battery usage, including models that are device-specific. Lastly, the Power-Aware Application Migration and Resource Scheduler module 715 uses the monitoring information acquired by the Application Power Monitoring module 710 to make resource scheduling decisions for applications running in the user's personal mobile devices.

In this case, the Power-Aware Application Migration and Resource Scheduler 715 consolidates application power profiles and current power availability from all the devices controlled by the user, and then makes informed decisions to manage and control the resource scheduling of applications at each of the individual devices, including admission control (i.e., stopping or delaying the launch of specific applications). In addition, the control actions include application migration from one device to another and can also include the use of communication and computing in a disaggregated manner across the devices.

For example, consider a user running applications in four personal mobile devices: a smart phone, a tablet, a laptop, and a gaming device. The user establishes policies that specify that the phone applications are to be allocated 40% of the total battery power. When those phone applications are running, depending on the battery being consumed at each device by the other applications, the Power-Aware Application Migration and Resource Scheduler module 715 may trigger the migration of some of these other applications to other devices with more battery available. The goal is to have batter allocation across the applications and devices controlled by the user so that each application perceives to have its own dedicated battery. As appreciated by one skilled in the art, the application migration and resource scheduling are transparent to the user. The user may set the power management policies with the User Policies and Rules engine 705 and the Application Power Monitoring module 710 and Power-Aware Application Migration and Resource Scheduler module 715 monitor and allocate the battery across the applications and devices accordingly.

Figure 8:
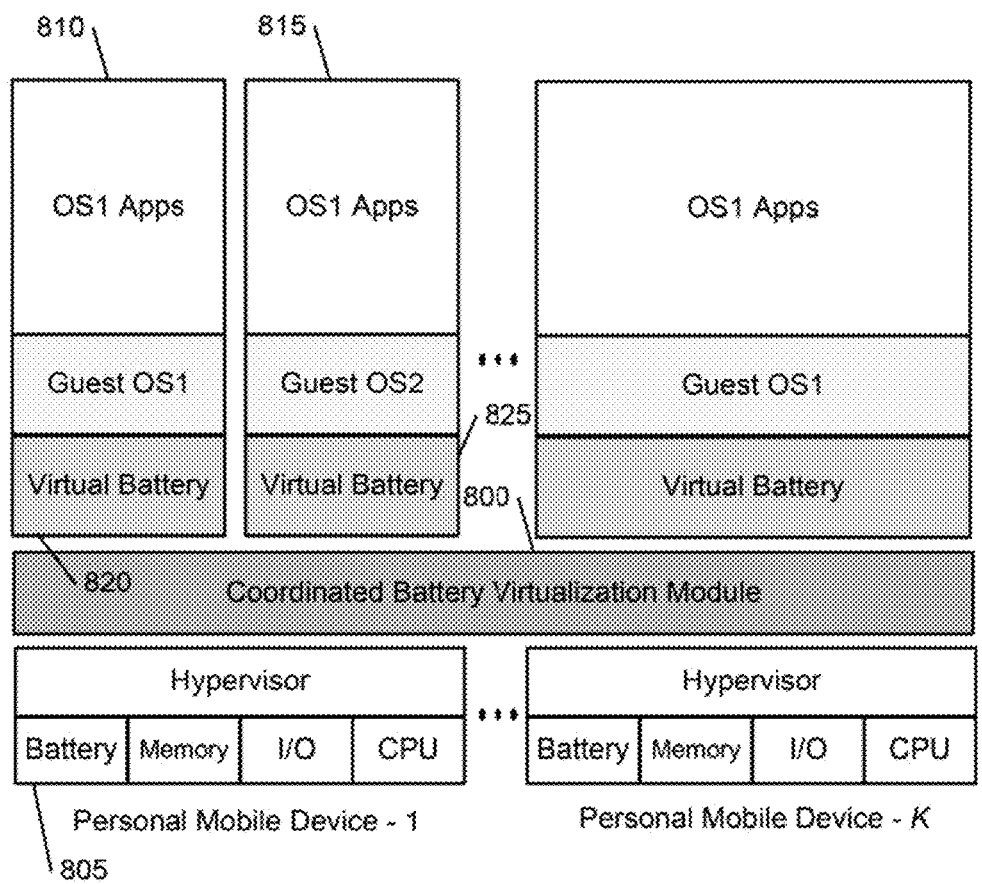
FIG. 8 is a schematic diagram illustrating an example implementation of a coordinated battery virtualization module according to various embodiments.

Attention is now directed to FIG. 8, which illustrates an example implementation of a coordinated battery virtualization module according to various embodiments. In this implementation, coordinated battery virtualization module 800 runs on top of as hypervisor in each of the personal mobile devices controlled by the user (e.g., mobile devices 1 through K) to virtualize a single physical battery in each mobile device into multiple virtual batteries. Each virtual battery is dedicated to a guest operating system ("OS") corresponding to a different user persona (e.g., business, personal, etc). Within each guest. OS, the virtual battery is allocated to different applications according to the power management policies specified by the user. For example, personal mobile device 1 (805) has two guest OSs, i.e., guest OS 810 and guest OS 815, each corresponding to a different persona and having as dedicated virtual battery, i.e., virtual battery 820 and virtual battery 825. The virtual batteries 820 and 825 are allocated to the applications hosted by the guest OSs 810 and 815 according to the policies set by the user.

As appreciated by one skilled in the art, the coordinated battery virtualization module 800 is shown implemented on top of the hypervisors in the personal mobile devices for illustration purposes only. Other implementations may be considered, including having the coordinated battery virtualization module 800 be integrated with the hypervisor in each personal mobile device. In case the mobile device is not equipped with a hypervisor, but includes to host OS, the coordinated battery virtualization module 800 can be implemented in the host OS.

Figure 9:
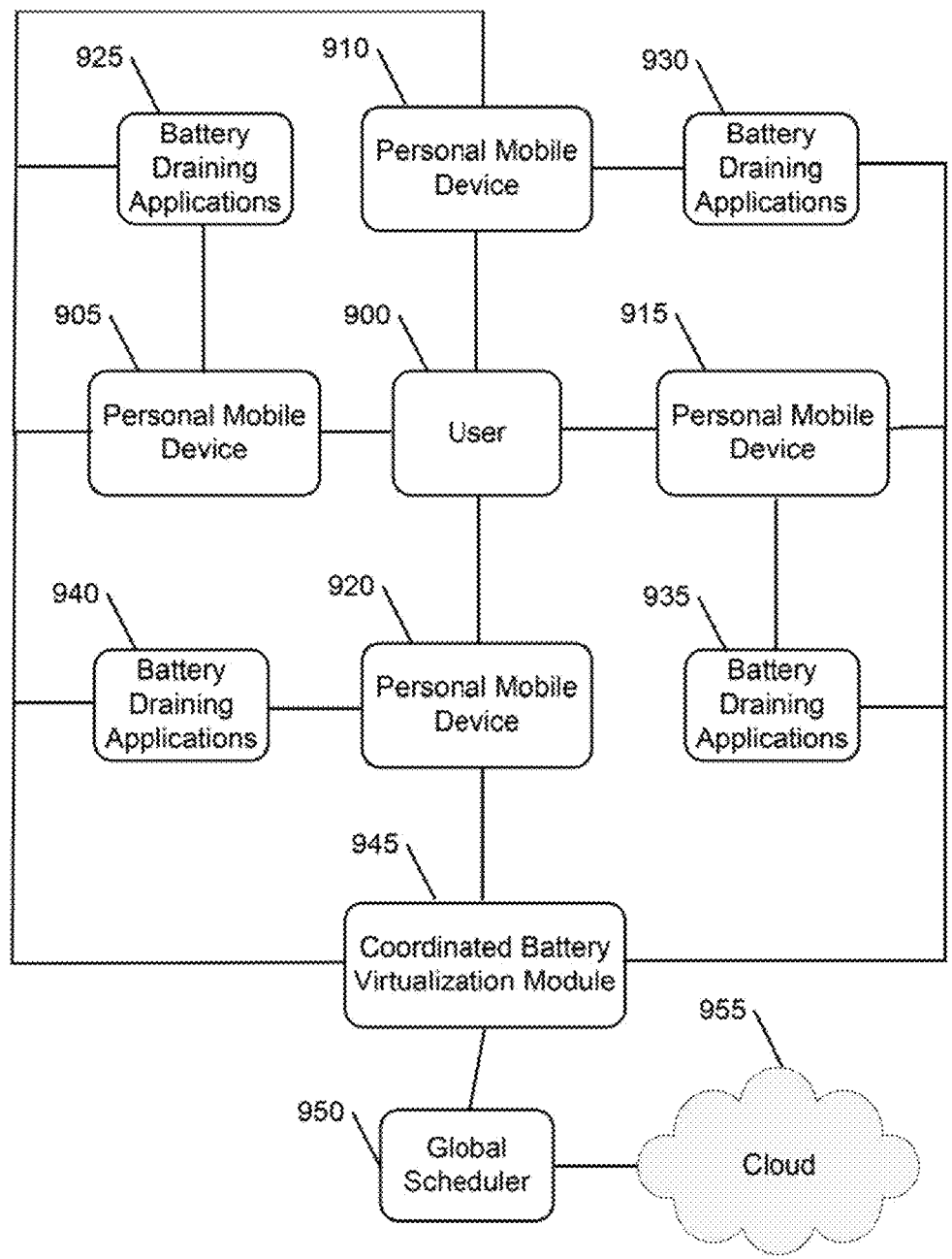
FIG. 9 illustrates an example coordinated battery virtualization module as deployed in a cloud network.

Referring now to FIG. 9, an example coordinated battery virtualization module as deployed in as cloud network is described. User 900 may control a number of personal mobile devices, such as, for example, personal mobile devices 905-920. Each of the personal mobile devices 905-920 runs a number or battery draining applications 925-940. A coordinated battery virtualization module 945 runs across the personal mobile devices 905-920 to allocate the total battery power among all battery draining applications 925-940. The coordinated battery virtualization module 945 has a global scheduler 950 running in the cloud 955 for coordinating the battery allocation to applications running in the personal mobile devices 905-920. The global scheduler 950 may consolidate application power profiles and current battery availability from all the personal mobile devices belonging to the user 900, and then make informed decisions to manage and control the Power-Aware Application Migration and Resource Scheduler modules running at each of the individual personal mobile devices 905-920.

Figure 10:
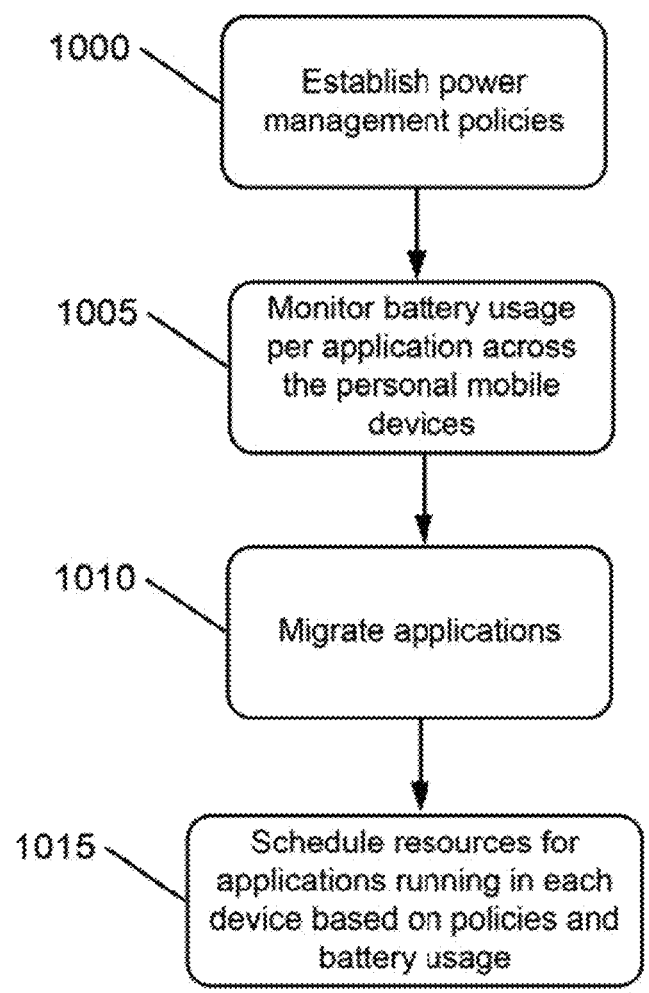
FIG. 10 is a flowchart for virtualizing a battery across personal mobile devices controlled by a user.

A flowchart for virtualizing a battery across personal mobile devices controlled by a user is shown in FIG. 10. First, policies for managing power and classifying applications running in the devices are established according to a user's requirements and preferences (1000). Next, battery usage per application is monitored across the personal mobile devices (1005). The monitored battery usage and policies are then used to migrate applications across devices according to the monitored balmy usages and the power management policies (1010). Resources are scheduled for the applications running in each device based on the monitored battery usages and the power management policies (1015).

Figure 11:
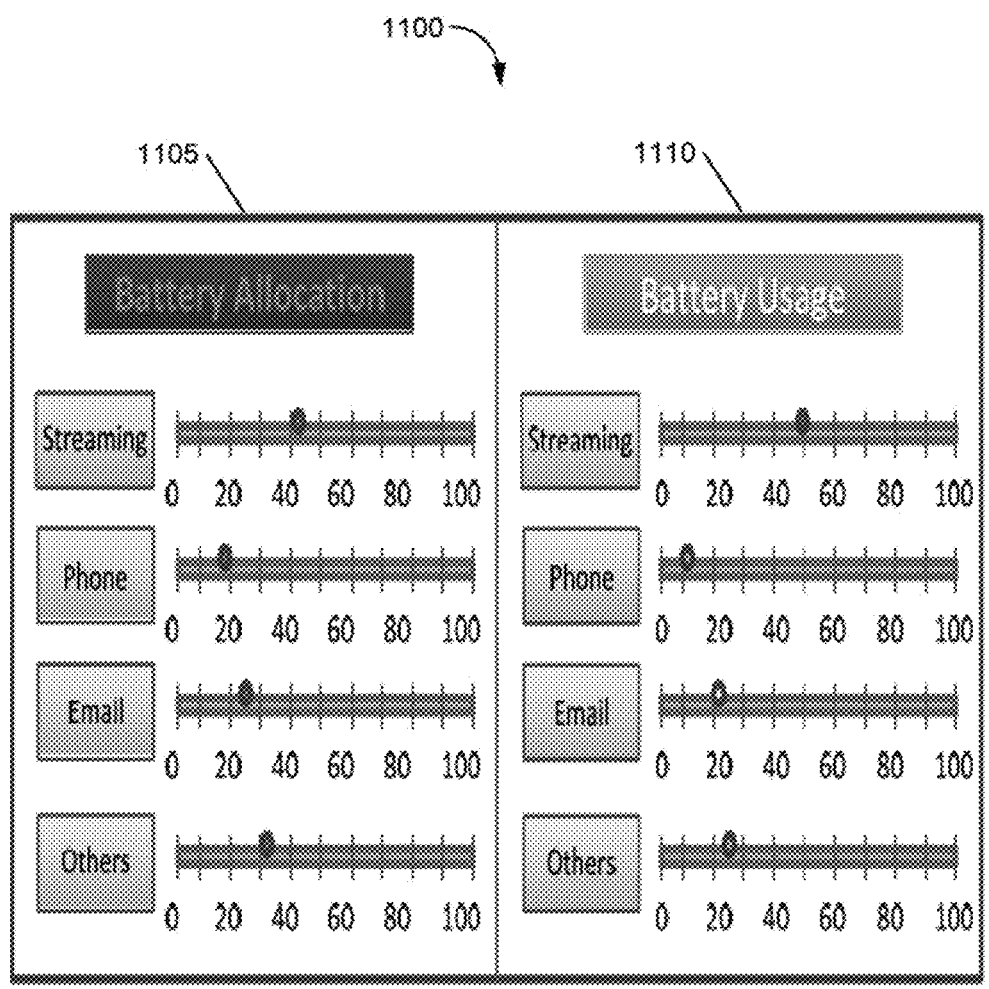
FIG. 11 is a user interface for specifying power management policies.

The power management policies may be specified by the user with a user interface such as the one illustrated in FIG. 11. User interface 1100 enables a user to allocate batter to different applications (i.e., streaming, phone, email and others) in the left window 1105 and, at the same time, monitor battery usage per application in the right window 1110.

Advantageously, the battery virtualization module 200 of FIG. 2 enables a user to allocate a device's available battery to specific applications and ensure that some applications have higher priority and access to the battery resource. Likewise, the coordinated battery virtualization module 700 of FIG. 7 enables a user to allocate the total battery power across a group of diverse personal mobile devices such that the user is guaranteed to have the necessary power to run all desired applications, thereby maximizing the total battery life and enhancing the user's QoE.

Figure 12:
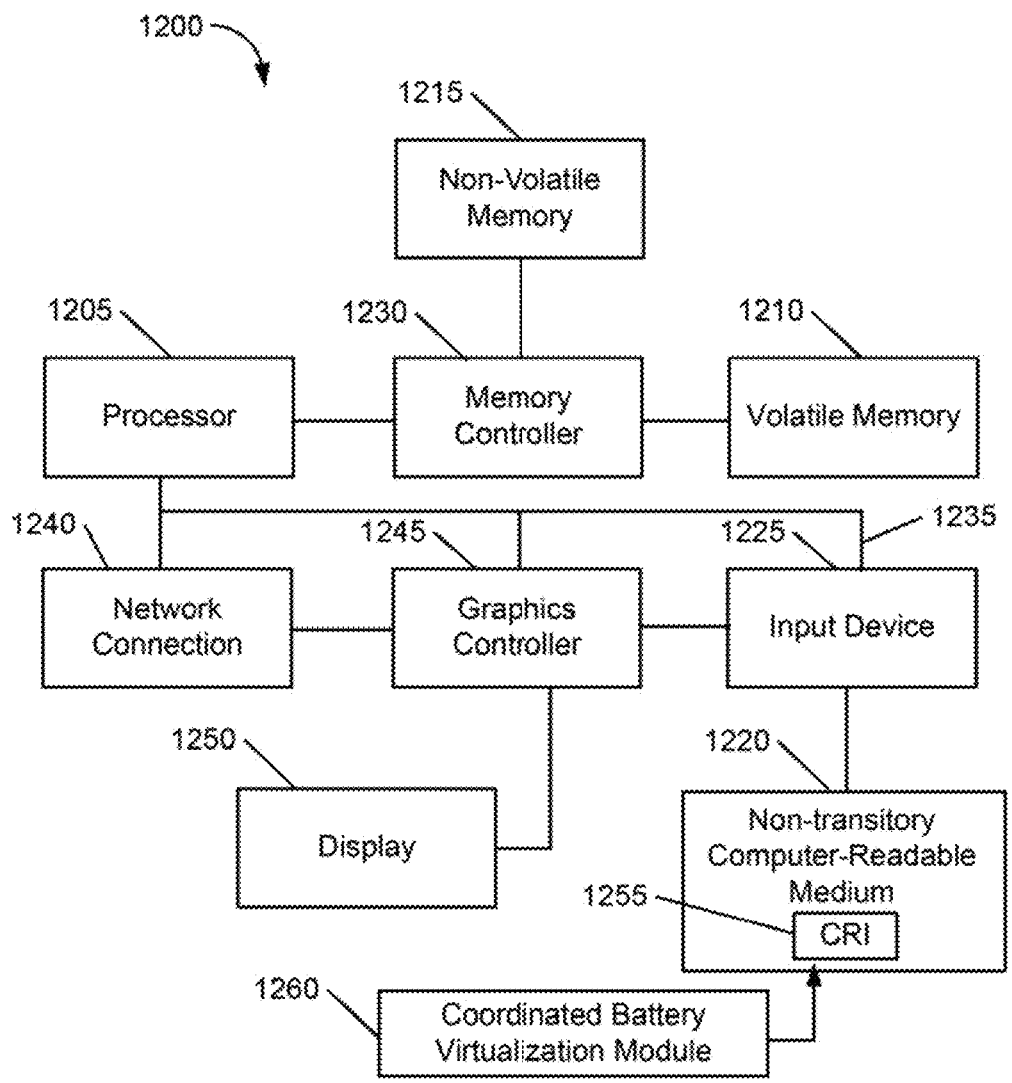
FIG. 12 is a block diagram of an example component for implementing the coordinated battery virtualization module of FIG. 7 according to various embodiments.

The battery virtualization module 200 of FIG. 2 and the battery virtualization module 700 of FIG. 7 can be implemented in hardware, software, or a combination of both. FIG. 12 illustrates a component for implementing the coordinated battery virtualization module 700 of FIG. 7 according to the present disclosure is described. The component 1200 can include a processor 1205 and memory resources, such as, for example, the volatile memory 1210 and/or the non-volatile memory 1215, for executing instructions stored in a tangible non-transitory medium (e.g., volatile memory 1210, non-volatile memory 1215, and/or computer readable medium 1220). The non-transitory computer-readable medium 1220 can have computer-readable instructions 1255 stored thereon that are executed by the processor 1205 to implement a Coordinated Battery Virtualization module 1260 according to the present disclosure.

A machine (e.g., a computing device) can include and/or receive a tangible non-transitory computer-readable medium 1220 storing a set of computer-readable instructions (e.g., software) via an input device 1225. As used herein, the processor 1205 can include one or a plurality of processors such as in a parallel processing system. The memory can include memory addressable by the processor 1205 for execution of computer readable instructions. The computer readable medium 1220 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 1215 can be a local or remote database including a plurality of physical non-volatile memory devices.

The processor 1205 can control the overall operation of the component 1200. The processor 1205 can be connected to a memory controller 1230, which can read and/or write data from and/or to volatile memory 1210 (e.g., RAM). The processor 1205 can be connected to a bus 1235 to provide communication between the processor 1205, the network connection 1240 and other portions of the component 1200. The non-volatile memory 1215 can provide persistent data storage for the component 1200. Further, the graphics controller 1245 can connect to an optional display 1250.

Each component 1200 can include a computing device including control circuitry such as a processor, a state machine, ASIC, controller, and/or similar machine. As used herein, the indefinite articles "a" and/or "an" can indicate one or more than one of the named object. Thus, for example, "a processor" can include one of more than one processor, such as in a multi-core processor, cluster, or parallel processing arrangement.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular configuration, such as component 1200.

Those skilled in the art would further appreciate that the various illustrative modules and steps described in connection with the embodiments disclosed herein may be implemented as electronic hardware, computer software, or combinations of both. For example, the example steps of FIGS. 4 and 10 may be implemented using software modules, hardware modules or components, or a combination of software and hardware modules or components. Thus, in one embodiment, one or more of the example steps of FIGS. 4 and 10 may comprise hardware modules or components. In another embodiment, one or more of the steps of FIGS. 4 and 10 may compose software code stored on a computer readable storage medium, which is executable by a processor.

To clearly illustrate this interchangeability of hardware and software, various illustrative components, blocks, modules, and steps have been described above generally in terms of their functionality (e.g., the Coordinated Battery Virtualization module 1260). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A system comprising:
   a processor; and
   a machine-readable non-transitory storage medium storing instructions and a set of power management policies for applications running in a plurality of personal mobile devices belonging to a first user, the instructions executable by the processor to:
   provide a user interface for the first user to specify battery allocations for applications or application classes running on the plurality of personal mobile devices;
   for each personal mobile device of the plurality of personal mobile devices, virtualize a physical battery of the personal mobile device into a plurality of virtual batteries;
   monitor processor and memory usage and compute an estimation of battery usage;
   monitor battery usage per application running in the plurality of personal mobile devices; and
   migrate applications across the plurality of personal mobile devices based on the monitored battery usage and the set of power management policies, wherein the set of power management policies specify battery usage allocations for multiple user personas and contexts associated with the plurality of personal mobile devices.

2. The system of claim 1, wherein the user interface displays monitored battery usage for the applications or application classes running on the plurality of personal mobile devices.

3. The system of claim 1, wherein each virtual battery is dedicated to a unique guest operating system, wherein each guest operating system corresponds to a unique user persona.

4. A method for virtualizing battery across a group of personal mobile devices controlled by a user, the method comprising:
  establishing power management policies for applications running in the personal mobile devices, wherein the power management policies specify battery usage allocations for multiple user personas and contexts associated with the personal mobile devices;
  providing a user interface for the user to specify battery allocations for the applications running in the personal mobile devices;
  for each of the personal mobile devices, virtualizing a physical battery of the personal mobile device into a plurality of virtual batteries;
  monitoring processor and memory usage and computing an estimation of battery usage;
  monitoring battery usage per application running in the personal mobile devices; and
  migrating applications across the personal mobile devices based on the monitored battery usage and power management policies.

5. The method of claim 4, wherein the set of power management policies are set by the user controlling the personal mobile devices.

6. The method of claim 4, further comprising scheduling resources for applications running in the personal mobile devices based on the monitored battery usage and power management policies.

7. The method of claim 4, wherein monitoring battery usage per application running in the personal mobile devices comprises monitoring battery usage across personal mobile devices that are virtualized and running hypervisors.

8. The method of claim 4, wherein each virtual battery is dedicated to a unique guest operating system, wherein each guest operating system corresponds to a unique user persona.

9. A non-transitory computer readable medium having instructions stored thereon executable by a processor to:
  display a user interface to specify power management policies for a group of personal mobile devices controlled by a first user, the user interface further to specify battery allocations for applications running on the group of personal mobile devices, wherein the power management policies specify battery usage allocations for multiple user personas and contexts associated with the group of personal mobile devices;
  for each personal mobile device of the group of personal mobile devices, virtualize a physical battery of the personal mobile device into a plurality of virtual batteries;
  monitor processor and memory usage and compute an estimation of battery usage;
  monitor battery usage for the applications running on the group of personal mobile devices;
  migrate applications across the group of personal mobile devices based on the monitored battery usage and power management policies; and
  globally schedule resources across the personal mobile devices based on the monitored battery usage and power management policies.

10. The non-transitory computer readable medium of claim 9, wherein each virtual battery is dedicated to a unique guest operating system, wherein each guest operating system corresponds to a unique user persona.

11. The non-transitory computer readable medium of claim 9, wherein the user interface is to display monitored battery usage for the applications running on the group of personal mobile devices.

* * * * *